United States Patent [19]

Lu et al.

[11] Patent Number: 6,009,474

[45] Date of Patent: Dec. 28, 1999

[54] METHOD AND APPARATUS FOR RE-ASSIGNING NETWORK ADDRESSES TO NETWORK SERVERS BY RE-CONFIGURING A CLIENT HOST CONNECTED THERETO

[75] Inventors: Gin-Pao Lu, Cupertino; Hank Jordan, San Jose; Paul Chu, Saratoga, all of Calif.

[73] Assignee: Compaq Computer Corporation, Cupertino, Calif.

[21] Appl. No.: 08/857,625

[22] Filed: May 20, 1997

[51] Int. Cl.[6] ............................................... G06F 13/00
[52] U.S. Cl. ........................ 709/245; 709/220; 709/221; 709/222
[58] Field of Search ................... 395/200.75, 200.51, 395/200.53, 200.54, 200.5, 200.56; 709/221, 223, 245, 224, 228; 340/825.52, 825.53; 370/471, 474, 475

[56] References Cited

U.S. PATENT DOCUMENTS

| | | | |
|---|---|---|---|
| 5,708,655 | 1/1998 | Toth et al. | 370/313 |
| 5,745,699 | 4/1998 | Lynn et al. | 395/200.75 |
| 5,751,967 | 5/1998 | Raab et al. | 395/200.58 |
| 5,819,042 | 10/1998 | Hansen | 395/200.52 |
| 5,835,723 | 11/1998 | Andrews et al. | 395/200.56 |
| 5,835,725 | 11/1998 | Chiang et al. | 395/200.58 |
| 5,838,907 | 11/1998 | Hansen | 395/200.5 |
| 5,852,722 | 12/1998 | Hamilton | 395/200.51 |
| 5,854,901 | 12/1998 | Cole et al. | 395/200.75 |
| 5,872,968 | 2/1999 | Knox et al. | 395/652 |
| 5,875,306 | 2/1999 | Bereiter | 709/220 |

*Primary Examiner*—Moustafa M. Meky
*Assistant Examiner*—Abdullahi E. Salad
*Attorney, Agent, or Firm*—Fenwick & West LLP

[57] ABSTRACT

The present invention provides a method and apparatus for re-assigning network addresses to a plurality of network servers by re-configuring a client host coupled to the network servers. According to the invention, when there are changes to network connections, the IP addresses (i.e., network addresses) of the individual network servers can be re-assigned automatically at the client host without powering off the network servers. According to the invention, in re-assigning a new network address to a port of the network server, a bootstrap protocol (BOOTP) request is first issued by the client host to the network server. The BOOTP request is received by the network server which then sends a BOOTP response to the client host to request a new network address. After the client host receives the BOOTP response, it sends a BOOTP reply to the network server. The BOOTP reply includes a new network address for the port of the network server. The above procedure is repeated for each port of the network server. Thus, each of the network server is re-assigned with a new network address. In this way, re-assignment of IP addresses of network servers is more efficiently performed. Furthermore, the work efforts are substantially reduced and are centralized.

23 Claims, 8 Drawing Sheets

```
?PAGE   "BOOTP TCPIP Message Declarations"
--Useful BOOTP related definitions
LITERAL sol~socket               = %HFFFF      ;  -- For SetSockOpt_nw, protocol ID
LITERAL so~broadcast             = %H0020      ;  -- For SetSockOpt_nw, broadcast opt
LITERAL so~rcvbuf                = %H1002      ;  -- For SetSockOpt_nw, broadcast opt
LITERAL msg~dontroute            = 4           ;  -- For Send_nw, don't route option
LITERAL ipport~bootps            = 67          ;  -- the BOOTP server IP port nunber
LITERAL ipport~bootpc            = 68          ;  -- the BOOTP client IP port number
LITERAL diag~task~port~num       = 6000        ;  -- the CLIP DIAG task port number
LITERAL inaddr~any               = 0D          ;  -- the "ANY" internet address
LITERAL inaddr~bdcast            = -1D         ;  -- the "broadcast" internet address
LITERAL af~inet                  = 2           ;  -- UDP, TCP, IP Address family
LITERAL bootreply                = 2           ;  -- the BOOTP reply opcode value
LITERAL bootrequest              = 1           ;  -- the BOOTP request opcode value
LITERAL vs~magic~cookie~val      = 1398227278D ;  -- = ("SWAN")
LITERAL vs~tag~swan              = 201         ;  -- SWAN TAG value = COMM bldg (201)
LITERAL vs~tag~end               = 255         ;  -- end tag value = 255
LITERAL vs~data~length~swan      = 22          ;  -- type + clip + track + flags +
                                                  --   date + time + snmp_eof +
                                                  --   vproc~len
LITERAL vs~data~length~swan01    = 18          ;  -- type + clip + track + flags +
                                                  --   date + time + vproc~len
LITERAL vs~node~type~cpu         = 1           ;  -- CPU node type value
LITERAL vs~node~type~swan        = 2           ;  -- SWAN node type value
LITERAL vs~flag~power~on         = 1           ;  -- SWAN flag power on
LITERAL vs~flag~path~b           = %H80        ;  -- 1 = PATH B
                                                  -- 0 = PATH A
```

```
433    -- BOOTP request and reply message definitions
434    STRUCT vendor~tadem~swan(*) ;              -- Tandem vendor-specific
435                                                  area for SWAN
436    BEGIN -- vendor specific area of BOOTP request/reply for CLIPs
437      INT(32)  vs~magic~cookie ;               -- Identifier for VS area = "SWAN"
438      STRING   vs~tag;                         -- vendor specific tag, = 201
439      STRING   vs~length;                      -- length of vendor data = 22 + vproc~len
440      STRING   vs~node~type;                   -- Tandem node type, 1 = CPU, 2 = SWAN
441      STRING   vs~clip~flags;                  -- Clip Flag bits, %H01 = Power on
442                                                  %H80 = PATH B
443      STRUCT   vs~date;                        -- date [YYYYMMDD]
444      BEGIN
445        INT          year;
446        UNSIGNED(8)  month;
447        UNSIGNED(8)  day;
448      END;
449      STRUCT   vs~time;                        -- date [YYYYMMDD]
450      BEGIN
451        INT          hour;
452        UNSIGNED(8)  minute;
453        UNSIGNED(8)  second;
454      END;
455      INT(32)  vs~snmp~file~size;              -- only valid in BOOTP reply packet
456      STRING   vs~clip~number;                 -- Clip number 1-3
457      STRING   vs~tracking~number [0:5] ;      -- SWAN Tracking number
458      STRING   vs~vproc~len;                   -- length of VPROC
459      STRING   vs~vproc[0:-1];                 -- VPROC from CLIP up to 256 chars
460      STRING   vs~endtag;                      -- = 255

461    END; -- vendor specific area of BOOTP request/reply
```

```
492  STRUCT bp~msg~def(*);
493  BEGIN -- bootp message                    -- Standard portion of BOOTP message
494     STRING    bp~op;                       -- packet opcode type
495     STRING    bp~htype;                    -- hardware addr type
496     STRING    bp~hlen;                     -- hardware addr length
497     STRING    bp~hops;                     -- gateway hops
498     INT(32)   bp~xid;                      -- transaction ID
499     INT       bp~secs:                     -- seconds since boot began
500     INT       bp~unused;                   -- reserved
501     INT(32)   bp~ciaddr;                   -- client IP address
502     INT(32)   bp~yiaddr;                   -- 'your' IP address
503     INT(32)   bp~siaddr;                   -- server IP address
504     INT(32)   bp~giaddr;                   -- gateway IP address
505     STRING    bp~chaddr[0:15];             -- client hardware address
506     STRING    bp~sname[0:63];              -- server host name
507     STRING    bp~file[0:127];              -- boot file name
508     STRUCT    bp~vend(vendor~tandem~swan); -- vendor~specific area
509
510  END; -- bootp message
```

METHOD AND APPARATUS FOR RE-ASSIGNING NETWORK ADDRESSES TO NETWORK SERVERS BY RE-CONFIGURING A CLIENT HOST CONNECTED THERETO

BACKGROUND OF THE INVENTION

The invention relates to a network system, and more particularly relates to a method and apparatus for re-assigning network addresses to a plurality of network servers by re-configuring a client host connected to the network servers.

Network systems have been utilized for connecting terminals, such as personal computers (PCs), workstations, etc., in different locations. In recent years, WAN systems have been widely implemented to provide connections for terminals in distant areas and provide Internet services. In a WAN system, typically a WAN concentrator is used as a diskless network server which connects terminals at one area to terminals at another distant area to facilitate communications between them. When a terminal at one area intends to communicate with a terminal at another distant area through the WAN network via a WAN concentrator, it sends a request with a specific network address (i.e., an IP address) to the WAN concentrator serving the sending terminal. When the WAN concentrator receives the IP address and recognizes it as its own IP address, it will facilitate the communication accordingly.

In a typical network arrangement, a CPU of a terminal, referred to as a client host, is connected to a number of network servers distributed in many different sites for example in a company. When there are changes to network connections due to, e.g., addition of network servers or re-allocation of workload among the network servers, it is desirable to re-assign the IP addresses of all the network servers so that the IP addresses are synchronized to one another. Conventionally, re-assignment of the IP addresses of network servers are accomplished by resetting the network servers by powering them off and then perform re-configuration operations on the network servers. The IP address re-assignment is done directly on each network server at the individual network server sites. When there are numerous changes to network connections occurring at different times, the amount of time required for individually re-configuring and re-assigning IP addresses to the network servers is tremendous.

Accordingly, there is a need for a system that allows re-assignment of the IP addresses of the network servers more efficiently.

SUMMARY OF THE INVENTION

The present invention is provided to overcome the above problems and to allow more efficient re-assignment of the IP addresses of network servers when there are changes to network connections.

The present invention provides a method and apparatus for re-assigning network addresses to a plurality of network servers by re-configuring a client host coupled to the network servers without powering off the network servers. According to the invention, in re-assigning a new network address (IP address) to a port of the network server, the client first issues a bootstrap protocol (BOOTP) request to the network server. The network server receives the BOOTP request and sends a BOOTP response to the client to request a new network address. After the client receives the BOOTP response, it sends a BOOTP reply to the network server. The BOOTP reply includes a new network address for the port of the network server. The above procedure is repeated for each port of the network server and for each network server. Thus, the network servers are re-assigned with new network addresses. According to the invention, re-assignment of IP addresses of network servers is more efficiently performed. The work efforts required are substantially reduced and are centralized.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5 shows an example format of a BOOTP message.

DETAILED DESCRIPTION OF THE PREFERRED EMBODIMENTS

Figure 1:
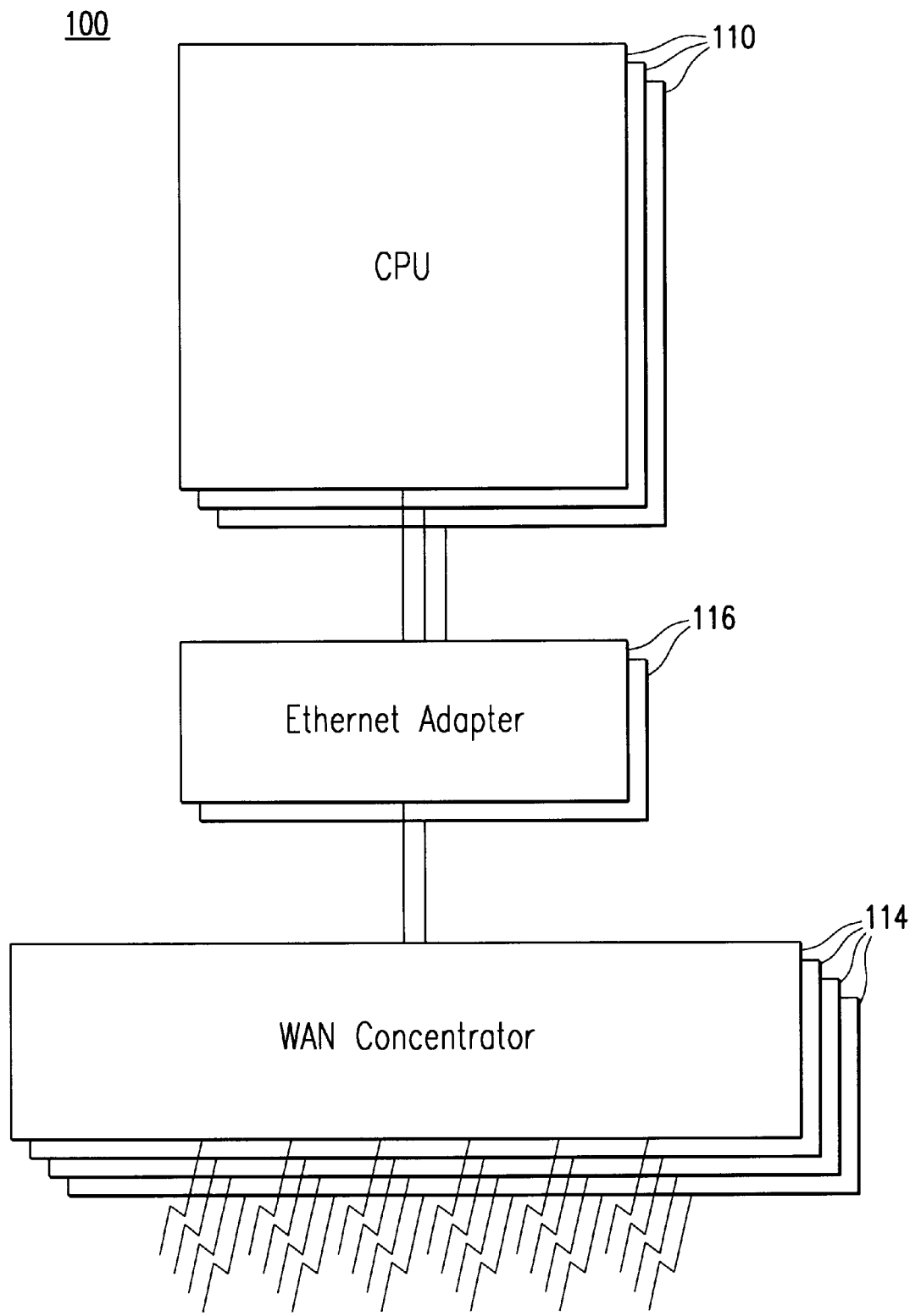
FIG. 1 shows a functional block diagram showing an overview of a network system.

FIG. 1 is a functional block diagram showing a WAN system 100 in which a preferred embodiment of the present invention is implemented. As shown in FIG. 1, CPUs 110 are coupled to WAN concentrators 114 via Ethernet adapters 116.

In network system 100, a CPU 110 is a client host, but also functions as a server for a local area network (LAN) (not shown) to allow the LAN to communicate to a WAN via an Ethernet adapter 116 and a WAN concentrator 114. A WAN concentrator 114 is a server in network system 100 and has an associated track ID. In a preferred embodiment, a WAN concentrator 114 comprises three CLIPs (communication line interface processors), each of which includes two ports for supporting two I/O lines for a total of six lines. In the preferred embodiment, each CLIP may be a Motorola M68360 QUICC processor. Each CLIP has an associated CLIP number. Each CLIP port is assigned with a MAC (Machine Access Code) address during manufacture. A separate IP address (network address) is also assigned to each port during system configuration by a user. Each CLIP is connected to CPU 110 via high speed parallel or serial interface and provides the processor engine to drive one or more communications lines.

Figure 2:
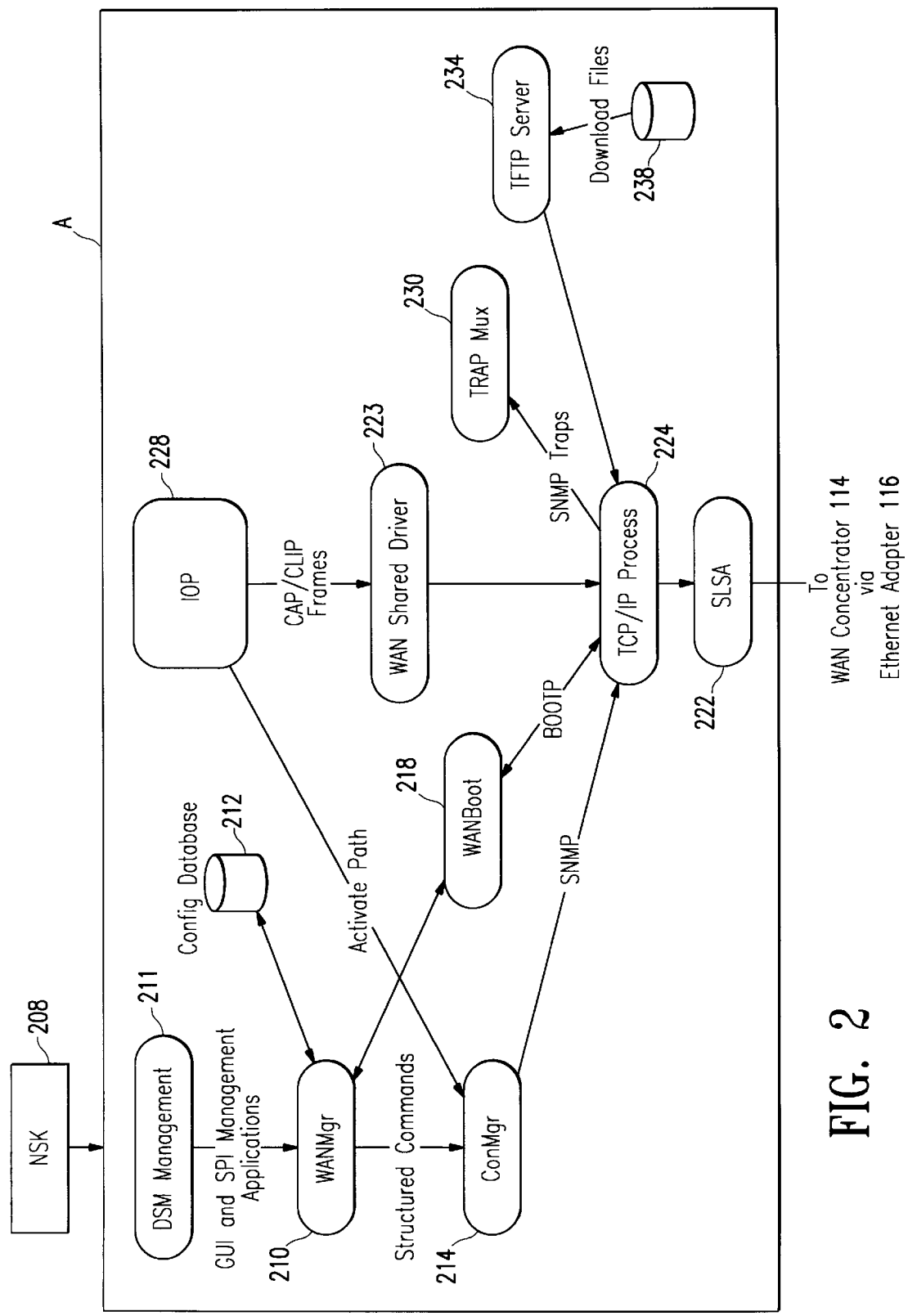
FIG. 2 shows the essential software components executed by the CPU that provide WAN support.

FIG. 2 shows the essential software components executed to the CPU that provide WAN support. The software processes in box A are executed under the control of an operating system, such as NonStop Kernel (NSK) 208 developed by Tandem Computers, Inc., Cupertino, Calif.

A WAN manager WANMgr 210 is linked to a DSM (Distributed System Management) management process 211, a configuration database 212 which contains configuration information of the WAN infrastructure, a concentrator manager ConMgr 214 and a WAN boot process WANBoot 218. WANMgr 210 may be started by NSK 208 as a subsystem manager and provides the DSM management functions for the WAN infrastructure. The DSM management functions allow a user to alter the tracking IDs of the WAN the IP addresses of CLIPs of WAN concentrators. This provides a way for a user to manage CRU (Customer Replaceable Unit) replacement and minor network segment re-configuration. The DSM management functions are performed by running a Graphical User Interface (not shown) and SPI (Subsystem Programming Interface) management applications (not shown) from the DSM management process 211 on WANMgr 210. WANMgr 210 also acts as a database server for supplying configuration information retrieved from configuration database 212 for various purposes, such as for WAN infrastructure configuration, IOP (IO process) initialization, etc.

Concentrator manager ConMgr 214 is a process configured by WANMgr 210 into each CPU in the system. ConMgr 214 supports a structured message interface that provides management of WAN concentrator accessibility through the use of SCF (Subsystem Control Facility) commands START, STOP, and ABORT on WANMgr 210. The SCF process (not shown) provides a text and management interface for the WAN infrastructure. ConMgr 214 also allows alteration of the configuration of the WAN concentrators, e.g., the tracking IDs, through the use of the SCF command ALTER on WANMgr 210.

A WAN IOP (I/O process) 228 is linked to ConMgr 214. An IOP is a privileged process that provides an API (application programming interface) that allows a user to access an I/O interface, such as a WAN line. To establish connection to the WAN concentrator, IOP 228 issues ACTIVATE PATH messages to ConMgr 214. ConMgr 214 will automatically select an IP address on behalf of the IOP as part of ACTIVATE PATH message processing.

IOP 228 is also coupled to WAN shared driver 223 which contains a set of library procedures for use by IOP 228 to access TCP/IP process 224 to establish TCP/IP port connections.

A WAN boot process WANBoot 218, which is a boot process, is also configured by WANMgr 210. WANBoot 218 provides a BOOTP client and a BOOTP server for an identified TCP/IP process 224 that supports the WAN infrastructure. BOOTP is a bootstrap protocol for providing initialization information to diskless nodes in an open network and is used as the mechanism to determine the CLIP IP addresses. The BOOTP protocol is defined in RFC (Request for Comment) 951, with "Vendor Information Extensions" defined in RFC 1395. Both of these RFCs are hereby incorporated by reference. RFCs are compiled by number by the IETF (Internet Engineering Task Force) and define standards for intercommunication on the Internet and similar networks. The BOOTP protocol is used between BOOTP client and server functions in the ConMgr process and the BOOTP server and client tasks in the WAN CLIPS. WANBoot 218 is triggered by WANMgr 210 to re-configure the IP address of a WAN concentrator when CPU 110 is cold loaded, i.e., initialized, when a TCP/IP process 224 is re-started, and when the configuration of a WAN concentrator is changed.

TCP/IP process 224 may be configured by a user. TCP/IP process 224 is a standard TCP/IP process as defined by RFC 793 and 791. In an alternative embodiment, TCP/IP process 224 may be configured as process pairs so that one is a backup for the other. In such alternative embodiment, each WAN concentrator is configured with preferred and alternate TCP/IP process names. TCP/IP process 224 is used to provide the transport layer between various processes in the WAN infrastructure, e.g., between WANBoot 218 and the BOOTP tasks in the WAN concentrator.

TCP/IP process 224 is also linked to TRAP mux 230 and TFTP server 234. TRAP mux 230 is a multiplexer process and is configured as a process to WANMgr 210. TRAP mux 230 is started as a running process by WANMgr 210. Once it is running, TRAP mux 230 captures SNMP (Simple Network Management Protocol) TRAP messages from TCP/IP process 224 identified to it and saves them.

TFTP Server (TFTPSRV) process 234 is also configured as a process to the WANMgr and is started as a running process by the WANMgr. One TFTPSRV is configured for each TCP/IP process 224 that supports the WAN infrastructure. Once it is running, TFTPSRV 234 accepts commands from the assigned TCP/IP process 224 and transfers the contents of an identified file from download files storage device 238 to a requesting WAN CLIP.

SLSA (ServerNet LAN System Access) 222 provides the Ethernet interface for CPU 110. SLSA 222 is accessed by the processes of FIG. 2 via TCP/IP process 224. SLSA 222 is used to accept input frames from TCP/IP process 224 and to issue output frames to WAN concentrator 114 via Ethernet adapter 116. Each Ethernet network interface (NI) line at a CLIP port of the WAN concentrator is represented by separate IP and MAC addresses which are accessed by SLSA 222.

Figure 3:
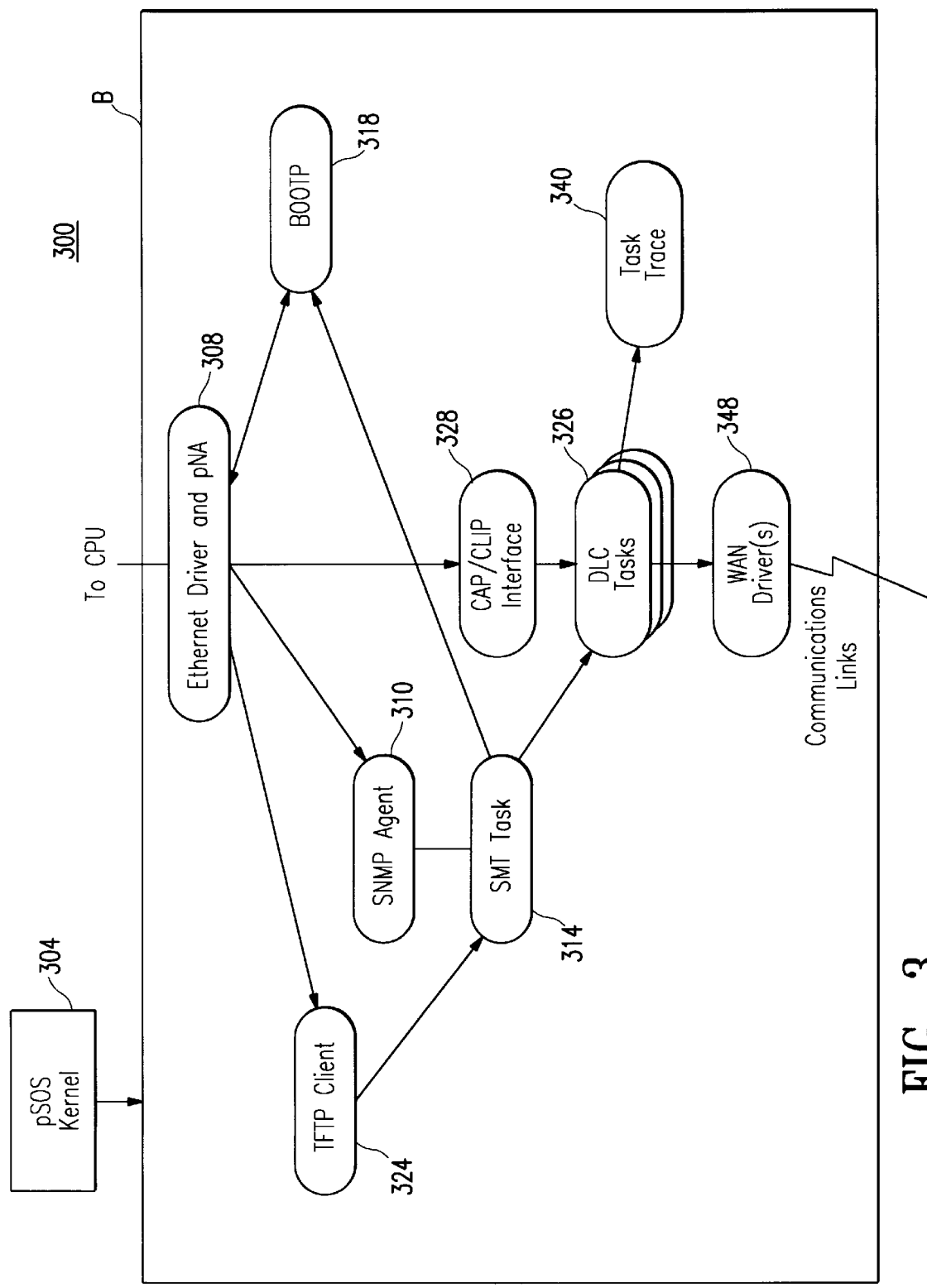
FIG. 3 shows the essential software blocks in a CLIP of a WAN concentrator.

FIG. 3 shows the essential software blocks in a CLIP 300 of WAN concentrator 114. The software processes in box B are executed under the control of a control program for WAN concentrator 114, such as pSOSystem kernel 304 provided by Integrated Systems Inc., Santa Clara, Calif.

Ethernet driver and pNA+ 308 connect WAN concentrator 114 to CPU 110. The pNA+, which is a TCP/IP stack, is the support for the TCP/IP layers and provides the Ethernet interface and the TCP/IP stack for WAN concentrator 114. The pNA+ is provided by Integrated Systems Inc. as part of the pSOSystem product. The pNA+ allows several network interfaces (NIs) to be configured within a node. In this embodiment of the invention, CLIP 300 supports two NIs.

In FIG. 3, SNMP agent 310 is the agent task that receives requests from ConMgr 214 for managing WAN concentrator 114. The SNMP agent 310 runs as a task under PSOS kernel 304 and is downloaded from CPU 110 when WAN concentrator 114 is started up. SNMP agent is defined by RFC 1157. SNMP agent 310 accesses SMT task 314 to provide specific management functions. SMT task 314 is a WAN manager task; it communicates with ConMgr 214 via SNMP agent 310. SMT task 314 interfaces with other tasks via mechanisms internal to the WAN concentrator software to perform management functions to objects within WAN concentrator 114, e.g., manage task initiation and termination for DLC tasks 326, initiate BOOTP process 318 in the WAN concentrator, etc., as described below.

TFTP (Trivial File Transfer Protocol) client 324 is a task retrieved from PSOS kernel 304. TFTP is defined by RFC 1350. TFTP 324 is triggered by SMT task 314 to transfer binary image files from CPU 110 to WAN concentrator 114.

CLIP 300 of WAN concentrator 114 also includes a BOOTP process 318. BOOTP process 318 provides support for two tasks, BOOTPC (BOOTP client), and BOOTPD (BOOTP server). The BOOTPC task is commanded to exchange request/response by SMT task 314 and by the BOOTPD task. SMT task 314 commands BOOTP to exchange request/response only at WAN concentrator power-on. When commanded, the BOOTPC task issues the BOOTP request (see RFC 951) on one or both of the Ethernet NIs, i.e., CLIP ports of the WAN concentrator to CPU 110 system. The BOOTP request includes the track ID of the WAN concentrator. The BOOTP server of the WANBoot process 218 in CPU 110 issues a BOOTP response to the WAN concentrator. The BOOTP response from CPU 110 identifies an IP address that will be associated with the CLIP port on which the IP address is received. Anytime the BOOTPC task is commanded to exchange BOOTP request/response, the resulting IP address replaces the previous IP address used for the CLIP port.

Figures 5, 5A, 5B, 5C:
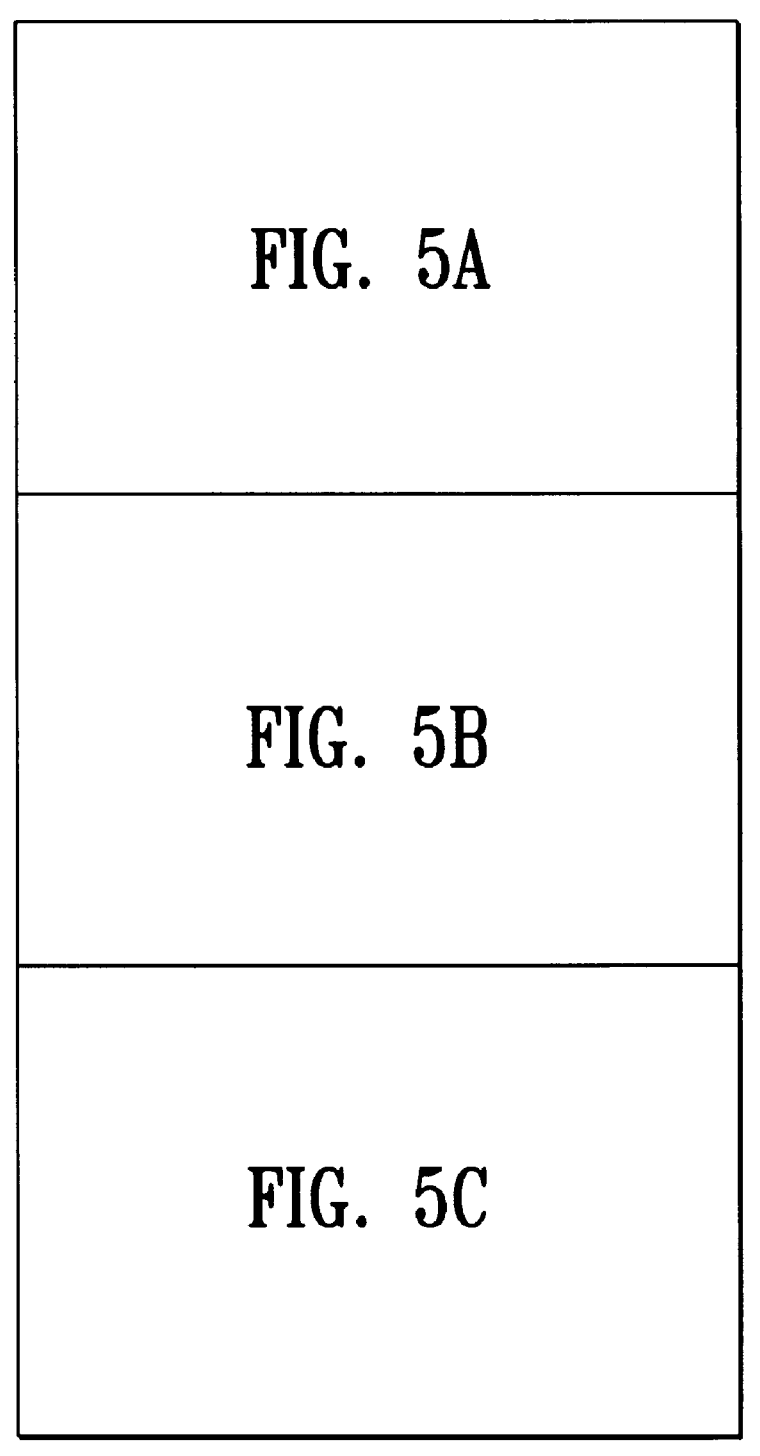

Whenever a BOOTP request from CPU 110 is received by the WAN concentrator and contains the CLIP number and track ID of the receiving CLIP, the BOOTPD task replies with a BOOTP reply and triggers the BOOTPC task to exchange the BOOTP request/response. The BOOTP request is identified as being from CPU 110 by the data defined in a vendor specific area of the BOOTP request message. The CLIP number and track ID are also in the vendor specific area of the message. An example format of the BOOTP request and reply messages are shown in FIG. 5.

In FIG. 3, DLC (Data Link Control) tasks 326 provide the necessary data link layer functions that are required for WAN IOP 228. The DLC tasks are downloaded using TFTP server 234 to WAN concentrator 114 when requested by IOP 228. Each DLC task is executed in the CLIP and controls one interface line of the WAN concentrator.

CAP/CLIP interface 328 contains a set of library procedures that are linked to DLC tasks 326. CAP/CLIP interface 328 processes CAP/CLIP messages which are used to transfer information between IOP 228 and DLC tasks 326. Task trace 340 is a concentrator trace interface for tracing DLC task activities and data. Task trace 340 is linked to DLC tasks 326 to allow DLC tasks 326 to initiate and terminate the tracing function. The library procedures of CAP/CLIP interface 328 and task trace 340 can be called from any DLC task.

WAN drivers 348 provides a software procedure interface for use by DLC tasks 326 to control the WAN communications links to the IOP (I/O Processes).

At power-on of WAN concentrator 114, the BOOTP client in BOOTP process 318 of each CLIP will generate BOOTP request messages on both the Ethernet ports for the purpose of obtaining its IP address. In the BOOTP request message, the CLIP will supply its track ID and CLIP number. The message is broadcast to the LAN and is routed to CPU 110 through SLSA LIF 242 and TCP/IP process 224 to WANBoot 218. WANBoot 218 will respond to the BOOTP request message if the track ID and CLIP number are found in configuration database 212. The WANBoot accesses configuration database 212 via structured messages sent to WANMgr 210. The PATH object definition for the track ID and CLIP number provides the IP address configured by the user. This procedure is repeated as WANBoot 218 receives BOOTP messages generated by the other CLIP Ethernet ports. The WANBoot sends its BOOTP reply according to the chicken/egg algorithm specified in the RFC 951 in which the reply may be sent back directly to the CLIP. The CLIP records its IP address from the BOOTP reply in its MIB (Management Information Base).

After the WAN system is initialized and operated, reconfiguration of the WAN system is sometimes required due to events such as where the TCP/IP assignment changes, etc.

WAN system re-configuration uses the same mechanisms as WAN system configuring. It is accomplished using the Distributed System Management (DSM) SCF program. As previously described, SCF is a text and management interface for the WAN infrastructure. The user issues SCF commands to the WANMgr to perform various functions. The SCF commands for the WAN infrastructure include the ADD, ALTER, DELETE, START, and STOP commands for the PROCESS, DEVICE, ADAPTER, SERVER, and PATH objects. The ADAPTER object and its associated SERVER, PATH, and TASK objects are used to define the six port communications line WAN concentrator. The DEVICE object is used to define a product IOP that will use the six port communications line WAN concentrator. The PROCESS object is used to define the ConMgrs, WANBoots, and product specific processes that make up the WAN infrastructure. When the WANMgr receives commands from SCF, it will create or stop the affected IOP/process as appropriate. After the system reconfiguration, the WANMgr updates configuration database 212.

There are situations where the configuration information in configuration database 212 may need to change. One situation is where the WAN concentrator is replaced for maintenance purposes, the tracking ID for the new WAN concentrator must be reflected in the configuration database 212. Another situation is where a user's network is to be modified, for example, where new WAN concentrators are added to the network or where re-allocation of workload among various WAN concentrators are required. In this situation, the IP addresses for the PATHs will need to change. In this latter situation, the invention allows centralized re-assignment of the IP addresses of the various WAN concentrators' ports to be done at the client host, as described below.

The DSM program provides the user an interface which allows the user to initially define the CLIP IP addresses and tracking ID of the WAN concentrator during the initial system configuration. This interface also allows the user to re-configure the IP addresses and tracking ID with minimal disruption to the system. The configuration information of the WAN concentrator needs to be updated after the system reconfiguration.

With the DSM program, the user sends SCF commands to the WAN manager WANMgr 210. WANMgr 210 updates configuration database 212 based on new system configuration information. First, all affected IOPs and CRUs are stopped by WANMgr 210 before network re-configuration starts. Then, the user enters an SCF ALTER ADAPTER (track ID) or ALTER PATH (IP address) command to WANMgr 210 which then starts the concentrator port initialization sequence.

Figure 4:
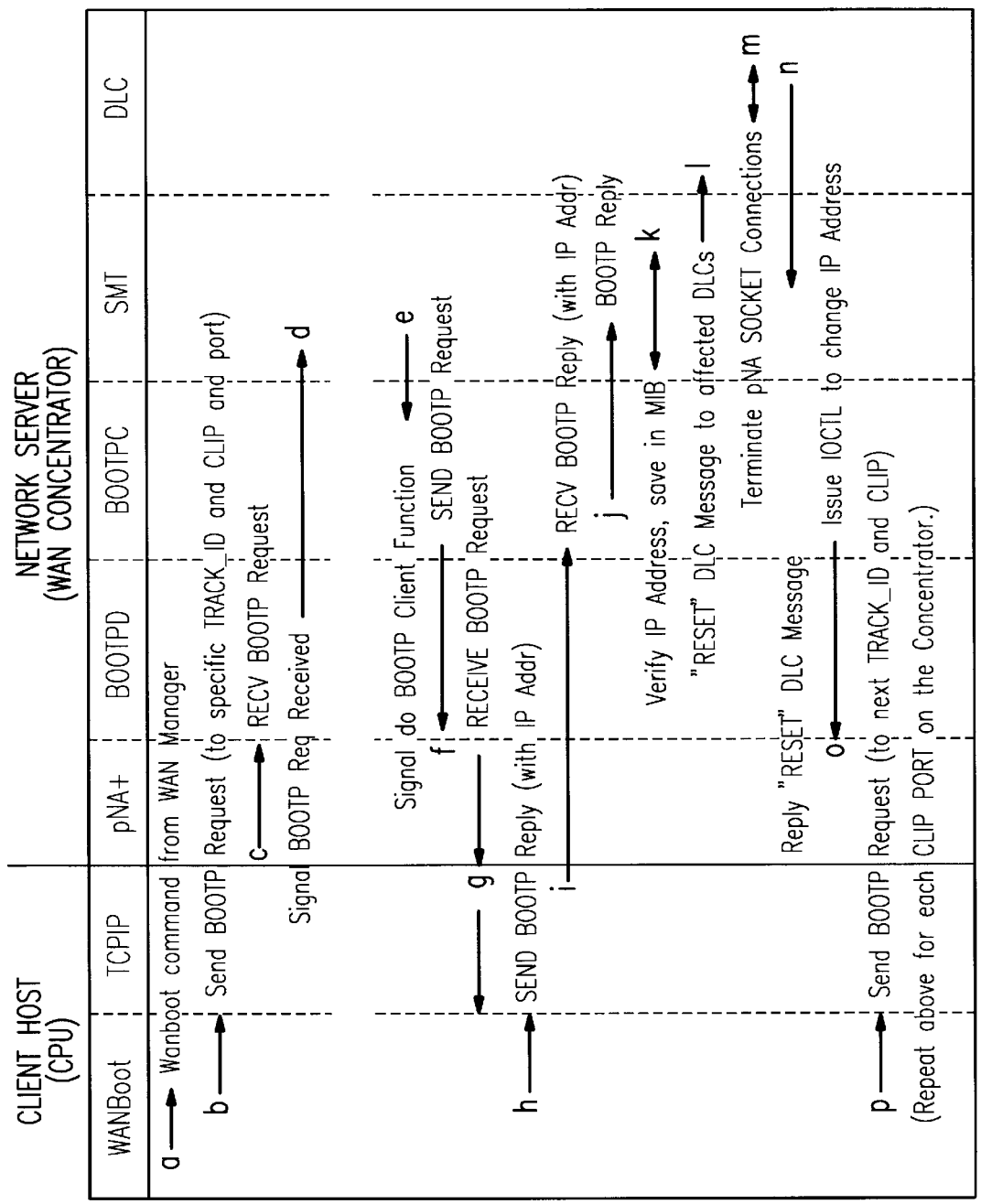
FIG. 4 illustrates the sequence for re-assigning a network address to a CLIP port of a WAN concentrator.

The initialization sequence is implemented in order to re-assign IP addresses to the WAN the concentrator ports upon occurrence of certain events, e.g., where the TCP/IP process stops functioning. FIG. 4 illustrates the initialization sequence of WAN concentrator ports. At step a, WANMgr 210 activates the BOOTP client function of WANBoot 218 with a WANBoot command. Then, the BOOTP client function of the WANBoot sends a BOOTP request with a specific track ID, a specific CLIP number and a specific port number by broadcasting, at step b. The track ID, CLIP number and port number are obtained from configuration database 212. The BOOTP client function of WANBoot 218 ensures that the WAN concentrators are informed when a TCP/IP process has been re-started or an IP address of the CLIP is changed. The WANBoot BOOTP client, after sending out the initial BOOTP request, does expect a BOOTP reply. If it is not forthcoming, ConMgr 214 will re-send subsequent BOOTP requests based on a delay and retry mechanism. This provides a reasonable assurance that the CLIPs all receive the BOOTP request from the CPU or are powered off.

At step c, the BOOTP request is received by the BOOTPD task in the WAN concentrator via pNA which provides the Ethernet interface and the TCP/IP stack for the WAN concentrator. Then the BOOTPD task informs SMT task 314, at step d, that the BOOTP request has been received from the WANBoot. At step e, SMT task 314 sends a signal to the BOOTPC task in the WAN concentrator to initiate the BOOTP client functions.

Then, as shown at step f, the BOOTPC task issues a BOOTP request to the CPU through the port at which the BOOTP request from the CPU was received. The BOOTP request issued by BOOTPC task of the WAN concentrator contains the track ID, CLIP number, and port number as shown in FIG. 5. At step g, the BOOTP server process of WANBoot 218 receives the BOOTP request from the BOOTPC task of the WAN concentrator. WANBoot 218 accesses configuration database 212 via structured messages sent to the WANMgr 210 to determine if the track ID and CLIP number can be found in the configuration database. If they are in the configuration database, then at step h, the BOOTP client process of WANBoot 218 sends a BOOTP reply with the IP address to the CLIP port via the TCP/IP process by broadcasting. The IP address is obtained from the configuration database and corresponds to the track ID and CLIP number provided in the BOOTP request from the WAN concentrator. At step i, the BOOTPC task in the WAN concentrator receives the BOOTP reply with the IP address via the pNA+. At step j, the BOOTPC task sends the BOOTP reply to the SMT task. The SMT task verifies the IP address at step k and saves it in MIB.

Then, at step l, SMT task 314 sends a "RESET" DLC message to the affected DLCs which are waiting to receive the data. Upon receiving the "RESET" DLC message, the affected DLCs terminate the pNA+ socket connections at step m. Thereafter, the affected DLCs send a reply message to the SMT task at step n. Concurrently with step j, at step o, the BOOTPC task issues an IOCTL (I/O control) command to change the IP address of the CLIP port and make the new IP address effective for the port. In this way, the IP address of the CLIP port that initially received the BOOTP request from WANBoot 218 of the CPU is changed.

Finally, at step p, the WANBoot in the CPU issues another BOOTP request to a next port of the CLIP in the WAN concentrator with a specific track ID, a specific CLIP number and a specific port by broadcasting. The IP address of the next port is thus changed in the same manner as described above. The above steps are repeated for each CLIP port on the WAN concentrator. Therefore, the IP addresses of the WAN concentrator ports are changed.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method of re-assigning a network address to a network server at a network client coupled to the network server, the method comprising the steps of:
   (a) issuing a bootstrap protocol (BOOTP) request by the network client to the network server;
   (b) upon receiving the BOOTP request by the network server, sending a BOOTP response by the network server to the network client to request a new network address; and
   (c) upon receiving the BOOTP response by the network client, issuing a BOOTP reply by the network client to the network server, the BOOTP reply including a new network address of the network server;
   wherein the network server is re-assigned with the new network address without rebooting the network server.

2. The method of claim 1, further comprising a step of verifying the new network address by the network server.

3. The method of claim 1, wherein the BOOTP response sent by the network server includes a track ID of the network server.

4. The method of claim 1, wherein the BOOTP request is broadcast to the network server by the network client.

5. The method of claim 1,
   wherein the network server has a plurality of ports;
   wherein step (a) to step (c) are performed for each port of the network server, so that each port of the network server is re-assigned with a new network address.

6. The method of claim 1,
   wherein the network server includes a BOOTP client process and a BOOTP server process and the network client includes a network boot process that has BOOTP client process and a BOOTP server process;
   wherein the BOOTP request is issued by the BOOTP client process of the network boot process in the network client;
   wherein the BOOTP response is sent by the BOOTP client process in the network server upon receiving the BOOTP request by the BOOTP server process in the network server;
   wherein the BOOTP reply is issued by the BOOTP client process of the network boot process in the network client upon receiving the BOOTP response by the BOOTP server process of the network booth process in the network client.

7. The method of claim 1, wherein computer program instructions for performing the method steps are embodied on a computer-readable medium.

8. A method of re-assigning network addresses to a plurality of wide area network (WAN) concentrators coupled to a client host, each WAN concentrator including an input interface, a bootstrap protocol (BOOTP) client process, a BOOTP server process and a manager process, the client host including a WAN booth process and a TCP/IP process, the WAN boot process including a BOOTP client process and a BOOTP sever process, the method comprising the steps of:
   (a) issuing a BOOTP request by the BOOTP client process of the WAN boot process in the client host to one of the WAN concentrators;
   (b) receive the BOOTP request by the BOOTP server process of the WAN concentrator;
   (c) sending a BOOTP response by the BOOTP client process of the WAN concentrator to the client host;
   (d) receiving the BOOTP response by the BOOTP server process of the WAN boot process in the client host;
   (e) issuing a BOOTP reply by the BOOTP client process of the WAN boot process in the client host to the WAN concentrator, the BOOTP reply including a new network address of the WAN concentrator;
   (f) verifying the new network address by the manager process in the WAN concentrator;
   (g) resetting, by the manager process in the WAN concentrator, any data link control tasks that are waiting for receiving data; and
   (h) issuing an I/O control command to an input interface of the WAN concentrator to make the new network address effective for the WAN concentrator;

wherein the WAN concentrator is re-assigned with the new network address without rebooting the WAN concentrator;

wherein the steps (a) to (h) are performed for each of the plurality of WAN concentrators, so that all of the WAN concentrators are re-assigned with new network addresses without rebooting the WAN concentrators.

9. The method of claim 8, wherein each WAN concentrator includes a plurality of communications line interface processors (CLIPs), each CLIP including a plurality of ports;

wherein step (a) to step (f) are performed for each port for each CLIP of each WAN concentrator.

10. The method of claim 9, wherein the BOOTP request is broadcast by the BOOTP client process of the WAN boot process in the client host to each WAN concentrator.

11. The method of claim 8, wherein computer program instructions for performing the method steps are embodied on a computer-readable medium.

12. An apparatus for re-assigning a network address to a network server coupled to a network client, the apparatus comprising:

a first portion disposed in the network client and configured to issue a bootstrap protocol (BOOTP) request to the network server;

a second portion disposed in the network server and configured to, upon receiving the BOOTP request from the network client, send a BOOTP response to the network client to request a new network address; and a third portion disposed in the network client and configured to, upon receiving the BOOTP response from the network server, issue a BOOTP reply to the network server, the BOOTP reply including a new network address of the network server;

wherein the network sever is re-assigned with the new network address without rebooting the network server.

13. The apparatus of claim 12, further comprising a fourth portion disposed in the network server and configured to verify the new network address.

14. The apparatus of claim 12, wherein the BOOTP response sent by the network server includes a track ID of the network server.

15. The apparatus of claim 12, wherein the BOOTP request is broadcast to the network server.

16. The apparatus of claim 12, wherein the network server has a plurality of ports;

wherein the BOOTP request, BOOTP response and BOOTP reply are exchanged between the network client and network server for each port of the server, so that each port of the network server is re-assigned with a new network address.

17. The apparatus of claim 12, wherein the network server includes a BOOTP client process and a BOOTP server process and the network client includes a network boot process that has BOOTP client process and a BOOTP server process;

wherein the BOOTP request is issued by the BOOTP client process of the network boot process in the network client;

wherein the BOOTP response is sent by the BOOTP client process in the network server upon receiving the BOOTP request by the BOOTP server process in the network server;

wherein the BOOTP reply is issued by the BOOTP client process of the network boot process in the network client upon receiving the BOOTP response by the BOOTP server process of the network boot process in the network client.

18. A computer program product having a computer-readable medium having computer program instructions recorded thereon for re-assigning a network address to a network server at a network client coupled to the network server, the computer program instructions comprising instructions for performing the method steps of:

(a) issuing a bootstrap protocol (BOOTP) request by the network client to the network server;

(b) upon receiving the BOOTP request by the network server, sending a BOOTP response by the network server to the network client to request a new network address; and (c) upon receiving the BOOTP response by the network client, issuing a BOOTP reply by the network client to the network server, the BOOTP reply including a new network address of the network server;

wherein the network server is re-assigned with the new network address without rebooting the network server.

19. The computer program product of claim 18, wherein the computer program instructions further comprise instructions for performing the method step of verifying the new network address by the network server.

20. The computer program product of claim 18, wherein the BOOTP response sent by the network server includes a track ID of the network server.

21. The computer program product of claim 18, wherein the BOOTP request is broadcast to the network server by the network client.

22. The computer program product of claim 18, wherein the network server has a plurality of ports and further comprising instructions for performing step (a) to step (c) for each port of the network server, so that each port of the network server is re-assigned with a new network address.

23. The computer program product of claim 18, wherein the network server includes a BOOTP client process and a BOOTP server process and the network client includes a network boot process that has BOOTP client process and a BOOTP server process;

wherein the BOOTP request is issued by the BOOTP client process of the network boot process in the network client;

wherein the BOOTP response is sent by the BOOTP client process in the network server upon receiving the BOOTP request by the BOOTP server process in the network server;

wherein the BOOTP reply is issued by the BOOTP client process of the network boot process in the network client upon receiving the BOOTP response by the BOOTP server process of the network booth process in the network client.

* * * * *